Figure 1:
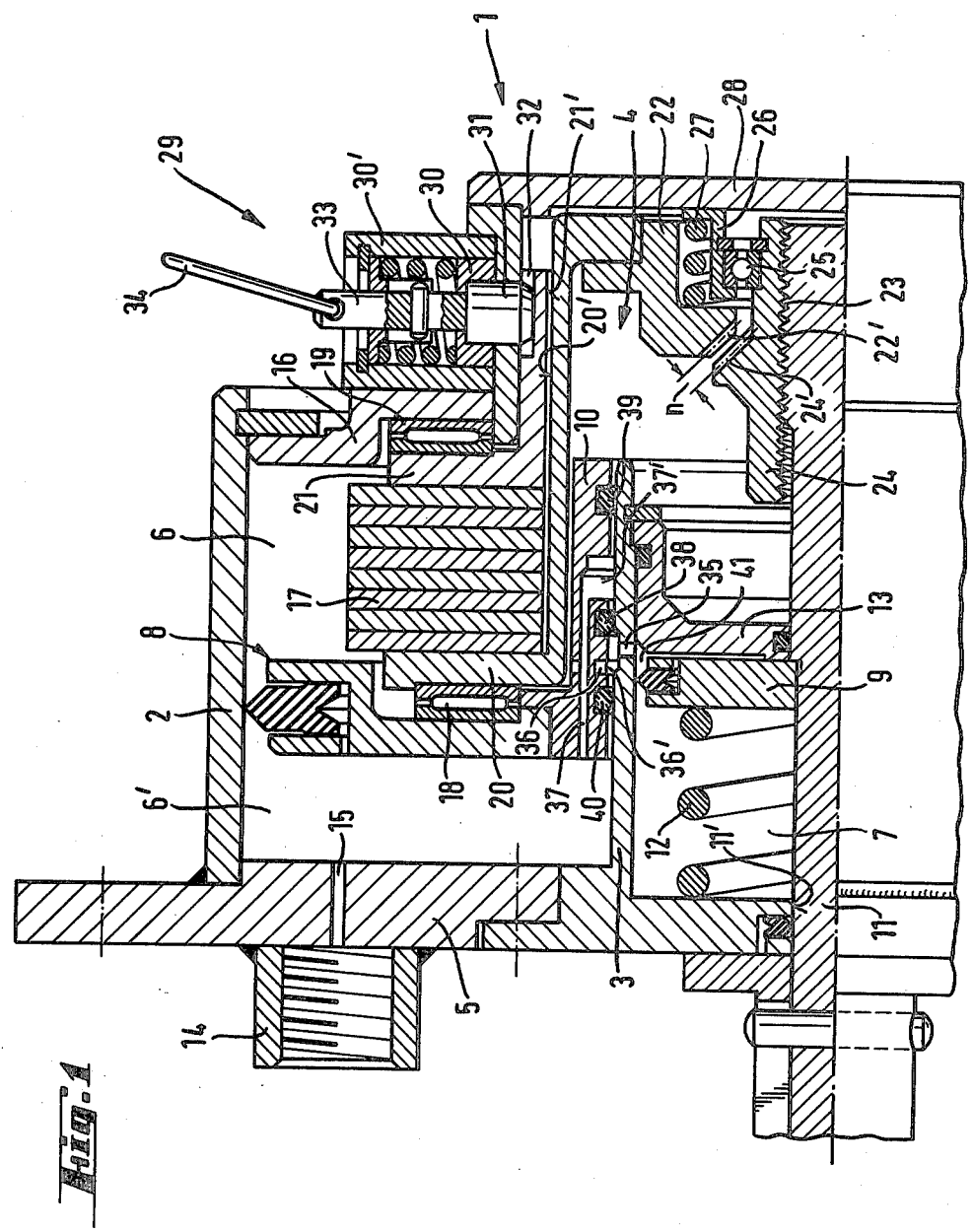

United States Patent [19]

Persson

[11] Patent Number: 4,472,995

[45] Date of Patent: Sep. 25, 1984

[54] SPRING-LOADED BRAKE CYLINDER

[75] Inventor: Erling Persson, Staffanstorp, Sweden

[73] Assignee: Knorr-Bremse GmbH, Munich, Fed. Rep. of Germany

[21] Appl. No.: 217,429

[22] Filed: Dec. 17, 1980

[30] Foreign Application Priority Data

Dec. 22, 1979 [DE] Fed. Rep. of Germany ....... 2952205

[51] Int. Cl.³ .......................... F01L 21/02; F01B 7/00
[52] U.S. Cl. ...................................... 91/189 A; 92/29;
92/63; 92/130 A; 188/170
[58] Field of Search ............. 91/189 A, 170 R, 189 R;
92/29, 63, 130 R, 130 B, 130 A; 188/170

[56] References Cited

U.S. PATENT DOCUMENTS 2,148,616  2/1939  Gruber ............................ 91/189 A
3,255,676  6/1966  Berg et al. ............................ 92/29
3,994,206 11/1976  Dahlkuist et al. ...................... 92/63
4,063,491 12/1977  Roger et al. ............................ 92/63

Primary Examiner—Paul E. Maslousky

[57] ABSTRACT

A spring-loaded brake cylinder has a slideable braking piston one side of which is acted upon by a first spring in the braking direction and a second side acted upon by air under pressure in the release direction against the force of the spring. There is a releaseable mechanical coupling between the braking piston and a piston rod upon which is mounted a quick-acting piston. The quick-acting piston is actuated by air. The position of the braking piston controls a supply of air to and a discharge of air from the quick-acting piston so as to achieve pressurization and depressurization of the quick-acting piston.

13 Claims, 2 Drawing Figures

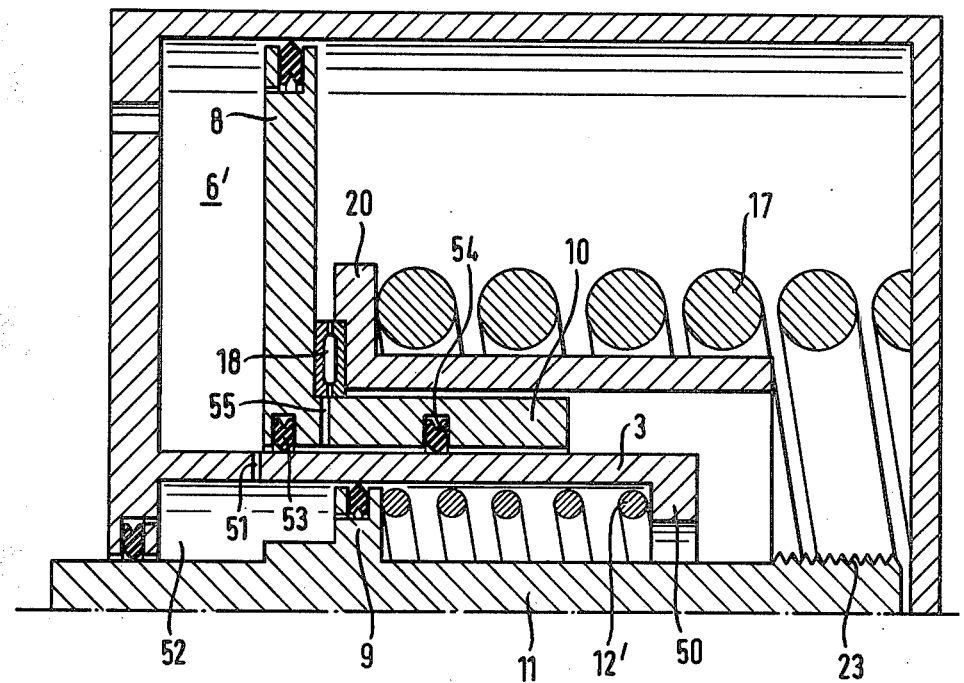
_Fig. 2_
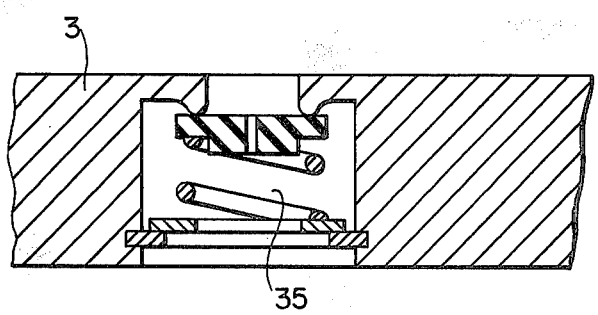
_Fig. 3_

SPRING-LOADED BRAKE CYLINDER

The present invention relates to a spring-loaded brake cylinder having a quick-acting cylinder for rapid displacement of the piston rod during the slack absorbing portion of the braking stroke for rail and other vehicles, more particularly, to a structure controlled by the braking piston for pneumatic pressurization and depressurization of the quick-acting piston.

Spring-loaded brake cylinders of the type having a quick-acting or operating piston have been described in the British Pat. No. 1 007 473 and in U.S. Pat. No. 3,255,676.

The spring-loaded brake cylinder combined with a service or operating brake cylinder according to British Pat. No. 1 007 473 requires two valve controlled connections for air under pressure. When the spring-loaded brake cylinder is in its braking position, air under pressure is introduced into the interior of the cylinder through a so-called release connection so as to act against the piston and move the piston to its open or release position. Air under pressure through the other connection (a braking connection) moves the braking piston to its closed or braking position. The braking piston is thus moved into the release position against the force of a main spring if there is sufficient pressure of air within the cylinder in order to actuate a pneumatic release of a coupling device employed for coupling the braking piston to the piston rod. Subsequently, the piston rod can be pulled back into the release position by the service brake spring.

In order to brake with such a spring-loaded brake cylinder, the release connection is actuated or controlled into its closing position and the braking connection is actuated into its open position. The pressure equilibrium acting upon the quick-action piston connected to the piston rod is thus unilaterally interrupted as result of which the quick-action piston initially displaces the piston rod into the braking direction. The braking piston is then coupled with the piston rod to push the piston rod with the force of the main spring into the full braking position as soon as the air pressure within the cylinder is decreased to such a level that the coupling device can move to its coupled position.

In the prior art, as exemplified by the above patents, the spring-loaded brake cylinder is controlled solely in response to pressure. For this purpose, two mutual and reciprocal compressed air connections are required which not only is expensive but in many cases not available. In addition, pneumatic control of the spring-loaded brake cylinder requires a precise adjustment of the forces with respect to each other so that in a braking operation the piston rod is quickly displaced in the braking direction and, subsequently, the pneumatic connection is actuated so that the full braking force of the main spring acts upon the braking piston and braking rod. Without this precise adjustment of the forces in the braking cylinder there is no assurance that the braking piston may not be coupled too early to the piston rod, i.e. before the piston rod has been displaced, or that the braking piston may be coupled with the piston rod too late, i.e. after the piston rod has already been displaced. Both of these coupling situations are clearly undesireable.

A further disadvantage of such known spring-loaded brake cylinders is that after a braking stroke has been completed under the force of the braking spring and the volume and pressure of the air cylinder has been reduced, the air cylinder will regain its full volume and full pressure only at a relatively slow rate.

Another disadvantage is that such a spring-loaded brake cylinder does not include an emergency brake release device and it is extremely difficult to incorporate such an emergency release device as, for example, described in DE-OS No. 26 08 502 in such a spring-loaded brake cylinder.

U.S. Pat. No. 3,255,676 also shows a spring-loaded brake cylinder combined with a service or actuating brake cylinder. In this structure the braking piston is acted upon by a main braking spring and has a relatively large diameter and a second or quick-acting piston is acted upon by an auxiliary pressure spring and has a smaller diameter. Both pistons are connected to air under pressure by means of a common cylinder chamber. In order that the piston rod is displaced in the braking direction during a braking operation by means of the quick-acting piston to overcome slack in the brake linkage before the braking piston is coupled to the piston rod, the forces of both of the above-described springs must be adjusted precisely with respect to each other. The auxiliary spring must thus be capable of displacing the piston rod against the resisting frictional forces of the brake linkage. For this reason, a relatively soft spring having a great length is necessary which in turn necessitates that the spring-loaded brake cylinder has a long overall length. The braking piston is coupled to the piston rod by a device which includes pneumatically actuated detents which are engageable in a rack or teeth on the quick-action piston. The pressures in the cylinder chamber must be precisely adjusted so that these detents engage the rack on the shaft of the quick-action piston only after a predetermined pressure reduction has occurred and after the piston rod has been displaced by the auxiliary spring in the braking direction. This is possible only if the spring-loaded brake cylinder is custom-built and specially adapted for a particular vehicle. Further, if the braking piston is coupled to the piston rod, the main braking spring is compressed to the extent necessary for exerting a full braking force against the braking piston only relatively slowly after the spring force has been expended during a braking operation.

This known spring-loaded braking cylinder does include an emergency release device but does not provide for any damping of the braking piston. In addition, the damping for the quick-action piston by means of a relatively soft spring is not at all satisfactory in view of the large magnitude of forces created when the brake linkage is suddenly released in an emergency braking operation.

It is therefore the principal object of the present invention to provide a novel and improved structure of the spring-loaded brake cylinder as described herein.

It is another object of the present invention to provide such a spring-loaded brake cylinder which has a relatively short length, a reduced weight and which does not require special or custom fitting such as with known spring-loaded brake cylinders.

It is an additional object of the present invention to provide such a spring-loaded brake cylinder in which the braking force of the main braking spring acts upon the piston rod at the same time or immediately after coupling of the braking piston to the piston rod.

It is still another object of the present invention to provide such a spring-loaded brake cylinder incorporating an emergency braking device which not only provides for satisfactory damping of the braking piston but also provides proper damping of the quick-acting piston.

According to the present invention, the spring-loaded brake cylinder may comprise a braking piston slideable in a cylinder and a piston rod which is adapted for connection to brake linkage. One side of the braking piston is acted upon by a first spring in the braking direction and the other side of the braking piston acted upon by air under pressure in the release direction against the force of the spring. Means, which may be mechanical, are provided to couple the braking piston to the piston rod. A quick-acting piston is connected to the piston rod in order to displace the piston rod in the braking direction and this quick-acting piston is pneumatically actuated. Means are provided on the braking piston responsive to the position of the braking piston for controlling a supply of air to and a discharge of air from the quick-acting piston to achieve pressurization and depressurization of the quick-acting piston.

Other objects and advantages of the present invention will be apparent upon reference to accompanying description when taken in conjunction with the following drawings, which are exemplary, wherein;

FIG. 1 is a half sectional view taken in the axial direction of a spring-loaded brake cylinder incorporating the present invention; and FIG. 2 is a view similar to that of FIG. 2 but showing a modification thereof.

Proceeding next to the drawings wherein like reference symbols indicate the same parts throughout the various views a specific embodiment and modifications of the present invention will be described in detail.

In FIG. 1, a spring-loaded brake cylinder is indicated generally at 1 and comprises a cylindrical housing 2 within which is an inner cylindrical wall 3 extending axially into a cylindrical chamber 4 from the front or brake side end wall 5 of the brake cylinder housing 2. The inner cylindrical wall 3 subdivides the cylindrical chamber 4 into a radially outer cylindrical chamber 6 and a radially inner cylindrical chamber 7. A braking piston 8 is slideably displaceable in the outer cylindrical chamber 6 and within the inner cylindrical chamber 7 there is a slideably displaceable quick-acting lifting or auxiliary piston 9.

The inner peripheral edge of the braking piston 8 is provided with an axially extending inner annular tubular portion 10 which is slideably displaceable on the outer surface of the cylindrical inner wall 3.

The quick-acting piston 9 is fixedly mounted on a piston rod 11 which is slideably guided through a central opening 11' in the brake end wall 5 and whose outer end is connected to the brake linkage of the vehicle in a manner known in the art and not shown in the drawing. In order to apply the brakes which are in a released state, the piston rod must be displaced a distance s in order to overcome any clearance and play existing in the brake linkage.

Between the brake side front end wall 5 and the face of the quick-acting piston 9 directed toward the front wall 5 there is a spring 12. The end of the cylindrical chamber 7 away from the front end wall 5 is closed by a wall 13 which is fixedly connected to the inner surface of the cylindrical inner wall 3 and whose inner end is sealingly engageable with the outer surface of the piston rod 11. The piston rod 11 is slideable through the wall 13.

On the brake side or front end wall 5 of the cylinder housing 2 there is a pressure connection 14 for a connection to a source of fluid, such as compressed air under pressure. Within the pressure connection 14 is a venturi or throttle opening 15 which communicates with an outer cylindrical chamber portion 6' defined between the front end wall 5 and the braking piston 8. This subchamber 6' can thus be connected with a source of compressed air through connection 14 and air can be vented from the sub-chamber 6' through connection 14 when the braking piston 8 is moving in the braking direction.

Between the braking piston 8 and a rear end wall 16 of the cylindrical housing there is a main braking spring 17 which is rotatably supported between the piston 8 and end wall 16 by suitable anti-friction thrust bearings 18 and 19. The spring 17 is actually disposed between two radially extending housing members 20 and 21 which are provided with axially extending portions 20' and 21' respectively which are concentric and slideable in relation to each other. An inner radial portion of the axial guide surface 20' is engageable with a clutch member 22. The rearward end of the piston rod 11 is constructed as a spindle shaft upon which is provided a non-self-locking thread 23. A nut 24 is threaded upon the spindle shaft threads 23 and on its outer peripheral surface there is mounted a radial ball bearing 25 upon which is mounted an axially extending sleeve 26 having a radial end flange. A spring 27 is positioned between the end flange of sleeve 26 and the clutch or coupling member 22 which acts in a direction to move the coupling teeth or elements 22' of coupling member 22 into coupling engagement with coupling elements 24' on the nut 24. The coupling teeth 22' and 24' are inclined at an angle to the longitudinal axis of the piston shaft 11 so as to define conical coupling surfaces which are engageable with each other.

When the braking piston 8 is in its release position as illustrated in FIG. 1, then force is transmitted from the braking piston through the spring housings 20 and 21 and coupling member 22 to hold the sleeve 26 against a stop or end portion 28 of the cylindrical housing 2 under the action of spring 27. In the release position of the piston rod 11, the quick-acting piston 9 is in position against the wall portion 13 as also shown in FIG. 1 and the nut 24 and coupling member 22 are disengaged or uncoupled from each other.

The spring-loaded brake cylinder is also provided with an emergency release device 29. The device 29 comprises a cylinder 30' which is fixedly mounted upon the brake cylinder 1 and is provided with a spring-loaded piston 30 on the end of which is a detent 31 which is engageable with correspondingly shaped notches or teeth in the outer peripheral surface of the axial guide surface 21'. The piston 30 is provided with an axially extending shaft 33 on the end of which is a pull handle 34. When the handle 34 is pulled upwardly or outwardly the detent 31 is moved outwardly against spring force to be disengaged from the gear teeth 32 to interrupt or break the locking against torque which holds the brakes retained by the detent 31 over the piston 11, the spindle shaft 23, the nut 24, the coupling member 22 and the spring housings 20,21.

In the cylindrical inner wall 3 there is provided a radial opening 35 or there may be a number of such openings distributed around the periphery of the inner wall 3. In the inner tubular portion 10 of the braking piston 8 there is a radially extending passage 36 and an axially extending passage 37 which opens at 37' on the inner peripheral surface of the tubular portion 10. The axial passage 37 extends from brake side end surface of the piston 8 to the opening 37'. The axial passage 37 is separate from and not connected to the radial passage 36. The opening 37' is located between sealing rings 38 and 39 seated in annular grooves formed in the inner peripheral surface of the inner tubular portion 10 of the braking piston. The radial passage 36 has an opening 36' located between the sealing ring 38 and a further sealing ring 40 similarly disposed in a groove in the inner peripheral surface of the tubular portion 10.

In the brake release position as illustrated in FIG. 1, a chamber 41 defined between the quick-acting piston 9 and the wall 13 is vented to the atmosphere through the radial opening 35 in the cylindrical inner wall 3 and the radial opening 36 in the braking piston tubular member 10. When the braking piston 8 is displaced in the braking direction a predetermined distance, the sealing ring 38 will slide over and past the radial opening or openings 35 so that the cylindrical chamber 6' is now connected to the chamber 41 between the quick-acting piston 9 and wall portion 13 through the axial passage 37 and the opening 35. As result, the quick-acting piston 9 will be acted upon by air under pressure from the cylindrical chamber 6' so that the quick-acting piston 9 will be displaced in the braking direction against the force of the spring 12 and the piston rod 11 is displaced a distance s to overcome the slack or play in the brake linkage.

The spring-loaded brake cylinder 1 which is shown in FIG. 1 in the brake release position, will operate in the following manner:

In the release position the chamber 6' is filled with air under pressure which is of sufficient force to push the braking piston 8 against the force of the braking spring 17 and to maintain the braking piston in this release position. In this release position, the sleeve 26 is forced against the inner surface of the end wall 28 against the force of spring 27 by means of the braking piston and the coupling member 22. The spring 27 is thus compressed. In the release position of braking piston 8, the chamber 41 between the quick-acting piston 9 and the wall portion 13 is vented to the atmosphere through bores 35 and 36 so that the quick-acting piston 9 on the piston rod 11 is displaced by the force of the spring 12 into contact with the housing wall 13 as shown in the drawing. In the release position the nut 24 on the spindle shaft thread 23 is uncoupled from the coupling member 22.

In order to apply the brakes, through suitable controls as known in the art, there is brought about a small pressure decrease in the sub-chamber 6' which causes the braking piston 8 to move toward the left under the force of spring 17 such that the sealing ring 38 slides past the opening 35 in the cylindrical inner wall 3. Air under pressure will now flow from the sub-chamber 6' through axial passage 37 and opening 35 into the chamber 41 as result of which the quick-acting piston 9 together with the piston rod 11 will be quickly displaced toward the left as seen in the drawings through the distance s to overcome play in the brake linkage. The movement to the left of the quick-acting piston 9 is against the force of the spring 12 which is now being compressed. The spindle 23 on the piston rod 11 is also now axially displaced toward the left as viewed in the drawing. The spindle 23 is mounted to be non-rotatable but is axially displaceable within the cylinder until engagement with a stop or abutment fixed within the cylinder. The meshing threads of the nuts 24 and spindle shaft portion 23 are non-self-locking as described above. When the spindle shaft 23 together with the piston rod 11 is moved axially, the nut 24 rotates. For this purpose, a coupling play n is maintained between the nut 24 and the coupling member 22. After the spindle 23 has been displaced a distance s so as to overcome the slack or play in the brake linkage, the axial displacement of the spindle shaft 23 as well as the rotation of the nut 24 will cease. Due to the momentary connection of the sub-chamber 6' to the chamber 41 of the quick-action piston there will be a prompt pressure decrease within this sub-chamber such that the braking piston 8 under the force exerted by the braking spring 17 is displaced in the direction to apply the brakes. This movement of the braking piston 8 causes the coupling member 22 to engage the nut 24 such that the nut 24 is now locked against rotation. The force of the main brake spring 17 is now transmitted through the coupling member 22 and the nut 24 to the spindle shaft 23 and upon further venting of air from the sub-chamber 6' the entire force of the braking spring is now utilized in the braking operation.

In order to release the brakes after a braking operation by means of air pressure, the pressure within the chamber 6' is now increased through the pressure connection 14. A pressure increase also results in the chamber 41 through the axial passage 37 through the opening 35. When the pressure within the chamber 6' is greater than the force applied by the braking spring 17, the braking piston 8 will be moved toward the right as viewed in FIG. 1 to its release position. When the sealing ring 38 passes over the opening 35 the flow of air from chamber 6' to chamber 41 will be blocked. The chamber 41 is now connected through the openings 35 and 36 to the atmosphere so that the chamber 41 will be vented in proportion to the cross-sectional area of the passage 36 to provide a damping action for the quick-acting piston 9.

When the braking piston 8 has displaced the sleeve 26 by means of the coupling member 22 against the stop wall portion 28 of the brake cylinder housing, the coupling member 22 will be uncoupled from the nut 24 so that the nut 24 is free to rotate and the auxiliary spring 12 can displace the quick-acting piston 9 to the right until the piston abuts the wall portion 13. All of the components of the brake cylinder 1 are now in their positions as illustrated in FIG. 1 for the release position of the brake.

In order to carry out an emergency release, the handle 34 is pulled upwardly against the force of the spring within the housing 30 which urges the detent or keeper 31 into engagement with the teeth 32 on the periphery of the axial guide surface 21'. When the detent 31 is disengaged from the teeth 32, the torque, which has acted against the detent through the nut 24, the coupling member 22, the spring housing parts 20 and 21 and piston rod 11 in the braking position, becomes free. As long as the detent 31 is pulled upwardly so as to be disengaged from the teeth 23, the main braking spring 17 will rotate between the bearings 18 and 19 by which the high force on the piston rod 11 can be released. The piston rod 11 thus may be considered to yield to the right as viewed in the drawing whereby the quick-acting piston 9 expels the air which is under atmospheric pressure in chamber 41 through the passages 35 and 37. According to the proportioning of the cross-sectional openings of the passages 35 in the inner housing wall 3 the piston rod advantageously attains a damped rear movement.

It is apparent that the passage or passages 35 in the inner housing wall 3 should have as large a cross-sectional area as possible with respect to application of the brakes so that the quick-action cylinder chamber 41 can become quickly filled with air under pressure from the sub-chamber 6' and thus the quick-acting piston 9 can be rapidly displaced in the braking direction a distance s to overcome brake linkage slack. On the other hand, the passage or passages 35 should have a relatively narrow or limited cross-section area in order to achieve the greatest possible damping of the piston rod 11 during an emergency braking operation. It is therefore apparent that the construction of the spring-loaded braking cylinders according to the present invention should incorporate a compromise unless there can be provided in the passage 35 a known throttle check valve which functions to provide essentially non-throttled flow of air in the direction of pressurization of the quick-action piston and provides throttled venting of air in the opposite direction in exhausting air from the chamber 41.

FIG. 2 shows in somewhat larger scale a schematic representation of a modified spring-loaded brake cylinder according to the present invention. Those elements in FIG. 2 which are the same as or perform the same function as corresponding elements in FIG. 1 are provided with the same reference symbols. FIG. 2 thus illustrates only those structural components of the modified spring-loaded brake cylinder which are necessary to comprehend this modified structure and does not illustrate all of the components of FIG. 1.

The auxiliary spring 12' in FIG. 2 is compressed between the quick-acting piston 9 and an abutment 50 formed as an internal flange on the inner cylindrical wall 3. The spring 12' thus acts in the opposite direction as the spring 12 in FIG. 1. There is a passage 51 in the inner cylindrical wall 3 which provides communication between chambers 6' and 52 in the brake release position. The chamber 52 is within the quick-acting piston defined by the inner cylindrical wall 3. The chamber 52 corresponds essentially to the chamber 7 in which is located the spring 12 in FIG. 1. In the tubular extension 10 on the braking piston 8 there are provided a spaced pair of sealing rings 53 and 54 and there is a passage 55 between these sealing rings. The rings 53 and 54 are sealingly engageable with the outer surface of the inner cylindrical wall 3.

The modified spring-loaded braking cylinder according to FIG. 2 operates in the following manner:

In the release position of the brakes the pistons 8 and 9 occupy the positions which are illustrated in FIG. 2. Both chambers 6' and 52 are connected to each other through the passage 51 in the inner housing wall 3. When the pressure in chamber 6' is decreased in order to initiate a braking operation, the braking piston 8 will be displaced a short distance to the left in the braking direction until the sealing ring 53 on the braking piston 8 passes over the passage 51. As result, the chamber 52 will be disconnected or blocked off from chamber 6' and air will be quickly vented from the chamber 52 through passages 51 and 55. Under the force of auxiliary spring 12' the quick-acting piston 9 with the piston rod 11 is quickly displaced toward the left as seen in FIG. 2 a distance s to overcome slack in the brake linkage as described above for FIG. 1. As the pressure in chamber 6' is further decreased, the braking piston 8 will execute the remaining portion of the braking stroke under the force of a spring 17 by means of which the full braking force is applied. The braking force piston 8 will be coupled to the piston rod 11 in the same manner as described above for FIG. 1 which has been previously displaced by means of the quick-acting piston 9 over the initial pistons to overcome the slack.

In order to release the brakes, air under pressure is introduced into the chamber 6'. The braking piston 8 will then be moved back against the force of the main braking spring 17 into its initial position as illustrated in FIG. 2. During the displacement of the braking piston 8 to the right in the release direction, the sealing ring 53 will pass over the passage 51 near the end of the return stroke so that the chamber 52 is now supplied with air under pressure from chamber 6' through passage 51. As result, the quick-acting piston 9 and the piston rod 11 will be moved toward the right under the force of spring 12' into their initial positions.

During an emergency braking operation initiated by the emergency release device, the spring 12' in the structure according to FIG. 2 will also perform the function of damping the released restoring force of the piston rod 11.

It is clearly apparent that the present invention is not to be limited to the structures as illustrated herein. It should be apparent to one skilled in the art that the spring-loaded brake cylinder according to the present invention is not limited to a braking operation where the piston rod pushes against the brake linkage but can also exert a braking operation by pulling the brake linkage. It is further evident that the flat spring 17 in FIG. 1 can be replaced by a helical spring as illustrated in FIG. 2.

The invention as disclosed herein is not limited to the emergency release device as it is illustrated in FIG. 1. Instead of this particular emergency release device, other known emergency release device structures can be employed in combination with the remaining structural features of the spring-loaded brake cylinder according to the present invention.

Finally, the present invention is not limited to a coupling device for coupling the braking piston 8 to the piston rod 11 after the latter has been displaced a distance s to overcome brake linkage slack. In FIG. 1 the braking piston 8 is connected to the spindle shaft 23 by means of the nut 24 and the coupling member 22. It will be apparent to one skilled in the art that other known forms of coupling devices can be employed in place of the coupling device illustrated in FIG. 1 and still achieve the results and objectives of the present invention.

It will be understood that this invention is susceptible to modification in order to adapt it to different usages and conditions and, accordingly, it is desired to comprehend such modifications within this invention as may fall within the scope of the appended claims.

What is claimed is:

1. A spring-loaded brake cylinder particularly for a railway vehicle comprising a braking piston slideable in a cylinder in braking and release directions, a piston rod adapted for connection to brake linkage, said braking piston having one side acted upon by a first spring in the braking direction and a second side acted upon by air under pressure in the release direction against the force of said first spring, means for coupling said braking piston to said piston rod, a quick-acting piston connected to said piston rod to displace slideably the piston rod in the braking direction, pneumatic means including passages for actuating said quick-acting piston, and means on said braking piston responsive to the position of said braking piston for controlling during braking a supply of air to and during release a discharge of air from said quick-acting piston to achieve respectively pressurization and depressurization of the quick-acting piston.

2. A spring-loaded brake cylinder as claimed in claim 1 wherein there is a cylindrical inner wall within said cylinder to define inner and outer cylindrical chambers, said braking piston being slideable in one of said cylindrical chambers and said quick-acting piston being slideable in the other of said cylindrical chambers, there being a first opening in said cylindrical inner wall communicating said outer and inner cylindrical chambers in response to positioning of said braking piston, there being a venturi opening in said outer cylindrical chamber through which air is exhausted during a braking stroke of said braking piston.

3. A spring-loaded brake cylinder as claimed in claim 2 wherein said braking piston has an inner annular portion slideably displaceable on said cylindrical inner wall, a pair of axially spaced sealing rings on said inner annular portion sealingly engaging said cylindrical inner wall, there being first passage means in said annular portion between said sealing ring and second passage means in said annular portion outside of said sealing rings such that a first portion of one of said outer and inner cylindrical chambers for pressurizing said quick-acting piston is connected through one of said passage means to the other of said outer and inner cylindrical chambers for pressurizing said braking piston or through the other of said passage means to the atmosphere in response to the position of said braking piston.

4. A spring-loaded brake cylinder as claimed in claim 3 and further comprising a third sealing ring on said inner annular piston sealingly engaging said cylindrical inner wall and said second passage means being disposed between said third sealing ring and one of said pair of sealing rings, said braking piston having a first position in which said first chamber portion is connected through said inner wall opening and said second passage means to a portion of the other chamber for pressurizing said braking piston and a second position in which said first chamber portion is connected through said inner wall opening and said first passage means to the atmosphere.

5. A spring-loaded brake cylinder as claimed in claim 1 and further comprising means for spring-loading said quick-acting piston in both the braking and release directions of the piston rod.

6. A spring-loaded brake cylinder as claimed in claim 5 wherein said spring-loading means comprises a second spring acting upon said quick-acting piston in the release direction of the piston rod, an end wall between said cylindrical inner wall and said piston rod to define with said quick-acting piston a chamber for pressurizing said quick-acting piston, said end wall further defining a stop for said quick-acting piston in the release direction of said piston rod.

7. A spring-loaded brake cylinder as claimed in claim 1 wherein said coupling means comprises a non-self-locking threaded shaft.

8. A spring-loaded brake cylinder as claimed in claim 1 wherein said piston rod is axially displaceable but non-rotatable and comprises a spindle shaft having a non-self-locking thread, a nut threaded upon said shaft, a coupling member connected to said braking piston and engageable with said nut by second spring means to couple said nut and coupling member.

9. A spring-loaded brake cylinder as claimed in claim 8 wherein said nut has a lug portion and said second spring means is disposed between said lug portion and said coupling member acting upon said coupling member in a direction to couple said coupling member and said nut.

10. A spring loaded brake cylinder as claimed in claim 9 wherein said lug comprises a sleeve having an end portion abutting against a portion of a housing of said cylinder under action of said second spring means when said braking piston is in its release position, in said release position said nut is uncoupled with respect to said coupling member and freely rotatable during the initial portion of an axial displacement of said spindle shaft.

11. A spring-loaded brake cylinder as claimed in claim 2 and further comprising releaseable locking means in the path of force transmission between said first spring and said piston rod, said first opening having such a cross-sectional area that said quick-acting piston chamber can be vented at a rate sufficient to displace said quick-acting piston and when said locking means is released said quick-acting piston pushes air from its chamber through said first opening.

12. A spring-loaded brake cylinder as claimed in claim 11 wherein said first opening has a throttle check valve therein to throttle venting in the direction of exhausting air from the pressurization portion of the chamber in which said quick-acting piston is disposed and flow in the direction of pressurization of said quick-acting piston is non-throttled.

13. A spring-loaded brake cylinder as claimed in claim 11 and further comprising anti-friction bearing means for rotatably supporting said first spring between said braking piston and a wall of the cylinder opposed from said braking piston such that torque is transmitted from said spindle shaft to said nut and coupling member to rotate said first spring when said locking means is released.

* * * * *